Jan. 19, 1943.   C. J. DEKEMA   2,308,866
PROGRESSIVE PURIFICATION OF BIOLOGICALLY IMPURE LIQUIDS
Filed July 19, 1939   2 Sheets-Sheet 1

Inventor
Cecil John Dekema
By
Pennie, Davis, Marvin & Edmonds
Attorneys

Jan. 19, 1943.  C. J. DEKEMA  2,308,866
PROGRESSIVE PURIFICATION OF BIOLOGICALLY IMPURE LIQUIDS
Filed July 19, 1939  2 Sheets-Sheet 2

Patented Jan. 19, 1943

2,308,866

UNITED STATES PATENT OFFICE 2,308,866

PROGRESSIVE PURIFICATION OF BIOLOGICALLY IMPURE LIQUIDS

Cecil John Dekema, Webber, Germiston, Transvaal, Union of South Africa

Application July 19, 1939, Serial No. 285,255
In the Union of South Africa July 30, 1938

4 Claims. (Cl. 210—7)

This invention relates to an improved method for progressive purification of sewage and/or other impure liquids which are impure by reason of their content of organic substances and which are required to be purified to a stage of non-putresence suitable for broad irrigation or for disposal into a public stream.

This invention provides primarily an apparatus and a process whereby sewage and other liquids are passed through what is commonly known as percolating or biological filter beds but in this case the various shortcomings of the ordinary filter bed are not only overcome but the amount of sewage or the like treated per unit volume of filter bed media can be considerably increased.

The filter employed consists of two or more compartments or chambers, each of which is filled with filter media, such as broken stone or any other substance which will provide a considerable surface area and at the same time provide by its interstices the necessary passage for liquid and air.

The chambers embodied in this apparatus may be to all intents and purposes identical.

Accordingly the present invention consists in percolating an impure liquid downwardly in succession through each of a series of two or more biological filters, the filter medium in each of which is aerated by the forcing therethrough of a regulated volume of an oxygen containing gas under controlled pressure, the arrangement being such that the partially purified effluent from each filter is in turn separated from the air and contained solids before it is passed as the influent to the next succeeding filter, and wherein means are provided for changing the order of sequence of liquid flow through the series, to permit recuperation and/or cleansing of the filter media to take place without lessening the rate of dosage. The partially purified liquid is collected in an air trap sump at the bottom of each filter, whence it passes to a separation or sediment tank, from which tank the supernatant liquid is elevated and passed as the influent to the top of the next succeeding filter.

In one form of construction the aeration is effected by passing air under pressure from a blower or the like, in a direction from the bottom to the top of each filter chamber enclosing the filter media. In a further form of construction air under pressure is passed through the series of filter chambers in succession so that in each chamber it passes upwardly in counterflow to the impure liquid percolating downwardly through the filter media. In a still further form of construction aeration is effected by passing air under pressure from a blower or the like, in succession through the series of filters, so that the said air passes through the filter media in adjacent filter chambers in alternate directions whereby in one chamber it passes downwardly through the filter media in the same direction as the percolating impure liquid, while in the succeeding chamber it passes upwardly through the filter media in counterflow to the impure liquid, or the air is passed upwardly, in counterflow to the percolating liquid in one chamber and downwardly through the succeeding chamber in the same direction as the liquid.

Means are provided to enable the whole or a part of the effluent liquid from any one filter chamber of the series to be circulated so as to form the whole or part of the influent to any other filter chamber. In the event of any filter of a series becoming clogged, or diminishing in efficiency, means are provided for changing the order of sequence of liquid flow through the series by a controlled transition involving proportionate stepwise mixing of the normal influent liquid, to any filter of the series with liquid of a different standard of purity from any stage within the process until the said sequence change is complete, thereby permitting recuperation of biological activity of any filter and preventing clogging of the filter medium from taking place, without lessening the rate of dosage of the biologically impure liquid being treated by the process.

In the above process the rate of dosage is substantially greater than that which would permit complete purification to take place in the first or primary filter of the series.

For maximum efficiency, the proportion of oxygen containing gas to the rate of dosage with impure liquid varies according to the strength and nature of the liquid treated and also the internal temperature of the filter media mass is maintained within the optimum operating temperature range of saprophytic bacteria or other beneficial organisms at work in the filter media.

For the prevention of transient or prolonged nuisance caused by the development and/or dissemination of insects (e. g., filter flies) or the evolution of undesirable or obnoxious odours means are provided for introducing into the aerating gas, at any convenient point in the system suitable quantities of insecticidal, disinfectant or deodorant substances in solid, liquid or gaseous form.

To increase the purification capacity, or to catalyse reactions of a physical, chemical or biological nature at play in the filter chamber, means are provided for introducing into the aerating gas, at any convenient point of the system, suitable quantities of solid, liquid or gaseous substances such as ozone, chlorine or the like.

To enable the invention to be more clearly understood and carried into practice, reference is now made to the accompanying drawings in which like reference numerals denote like parts throughout:

In the drawings—

Figure 1:
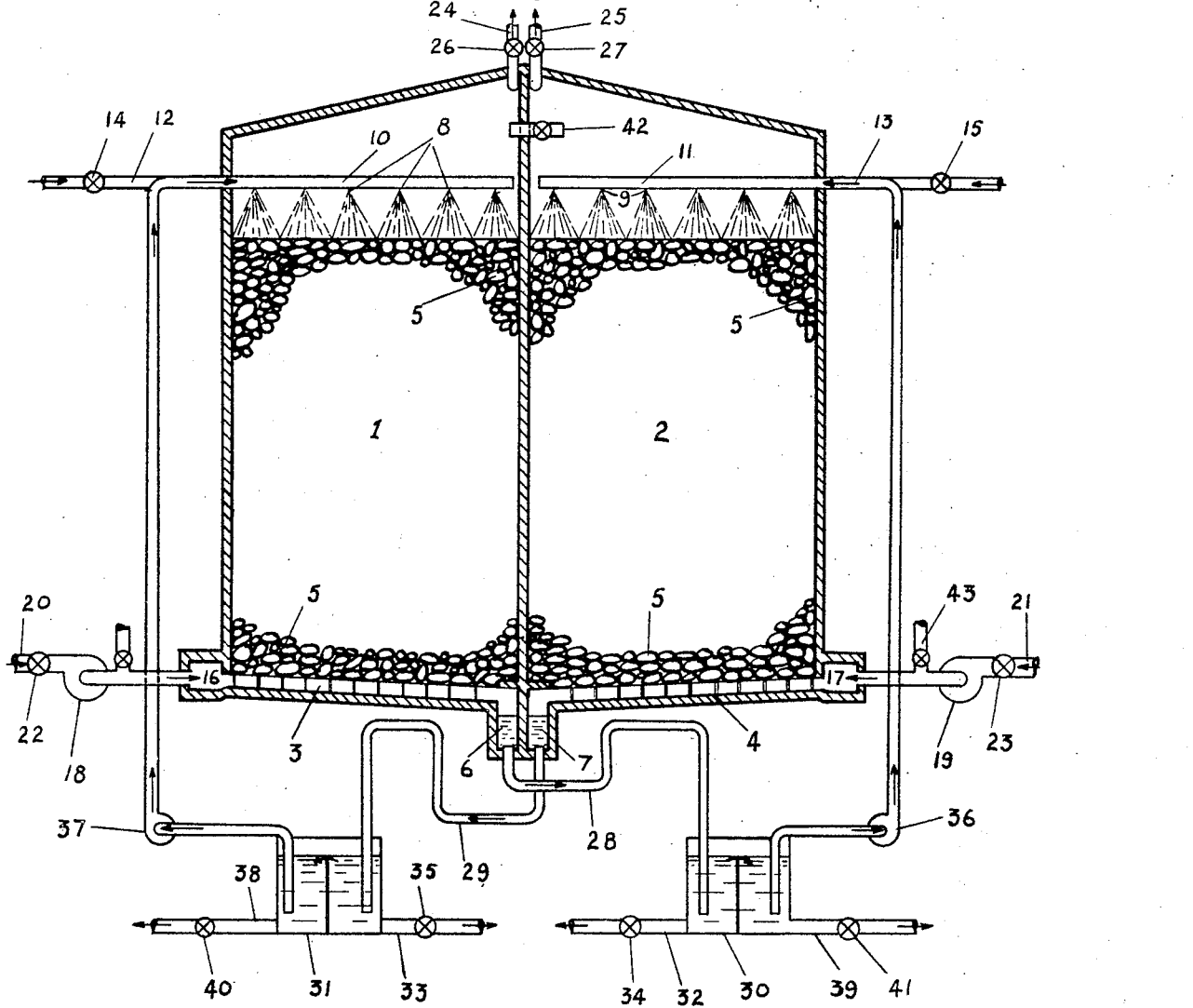
Fig. 1 is a diagrammatic vertical section of the apparatus.

The apparatus consists essentially of at least two self-contained chambers 1 and 2 at the bottom of which suitable drains 3 and 4 are provided to collect the liquid after it has passed through the filter media 5 contained in said chambers, and to discharge the liquid into chambers or air trap sumps 6 and 7 at the bottom of each filtration chamber. The sewage is uniformly distributed over the surface of the filter beds by series of sprinklers 8 and 9 which are fed by pipes 10 and 11 which in turn are connected by pipes 12 and 13 and control valves 14 and 15 to the feed line conveying the sewage to be treated.

Simultaneous with the flow of the sewage through the sprinklers 8 and 9, air is forced into the filtration chambers through pipes or other suitable means such as ducts 16 and 17. The air may be forced into the filtration chambers by means of blowers 18 and 19 which are connected to air supply pipes 20 and 21 and fitted with control valves 22 and 23. The air may also be drawn through the filtration chambers by any suitable means connected to pipes 24 and 25 which are connected to valves 26 and 27 respectively and are placed in the top of the chambers, in which case suitable air inlets are to be provided at the bottom of the chambers.

In chambers or air trap sumps 6 and 7, the effluent from the filtration chambers are trapped to the exclusion of air and flies, and are passed through pipes 28 and 29 into separation or sediment tanks 30 and 31 respectively where the humus and/or other solids are separated and the latter drawn off through pipes 32 and 33 and valves 34 and 35.

In operation sewage to be treated passes through valve 14 and pipe 12 into pipe 10 and is distributed over filter media 5 in chamber 1. The liquid passes downwardly through the filter media while air is forced through duct 16 upwardly through the filter media and passes out the top of chamber 1 through pipe 24 and valve 26. The partly purified liquid flows into chamber or air trap sump 6, from which it flows through pipe 28 into separation or sediment tank 30. In said tank the humus and/or other solid matter are separated from the fluid, the latter is elevated from the tank by means of a suitable pump 36 and used as the influent for filtration chamber 2, while the humus and/or other solid matter is drawn off through pipe 32 and valve 34. The process in chamber 2 is similar to that in chamber 1, the effluent of chamber 2 flows into chamber or air trap sump 7 from where it flows through pipe 29 to sediment tank 31 from where the liquid is elevated by pump 37 and the whole or part of said liquid may be recirculated through chamber 1 or 2, or may be circulated through a further series of filtration chambers or the liquid may be disposed of.

Air is also forced through the filter media, entering the chamber 2, through duct 17 and finds exit through pipe 25 which is connected to valve 27. Either fresh air or the air from chamber 1 can be passed through chamber 2 from the bottom upwards. In the latter case pipe 24 will be connected to pipe 43. In an alternative arrangement, a pipe 42 producing communication between the top ends of chambers 1 and 2 is provided, through which the air, after passing through the filter media of chamber 1 from the bottom upwards, is passed into chamber 2. The air then passes downwardly through the filter media of chamber 2 and finds exit through duct 17 or other suitable means.

Figure 2:
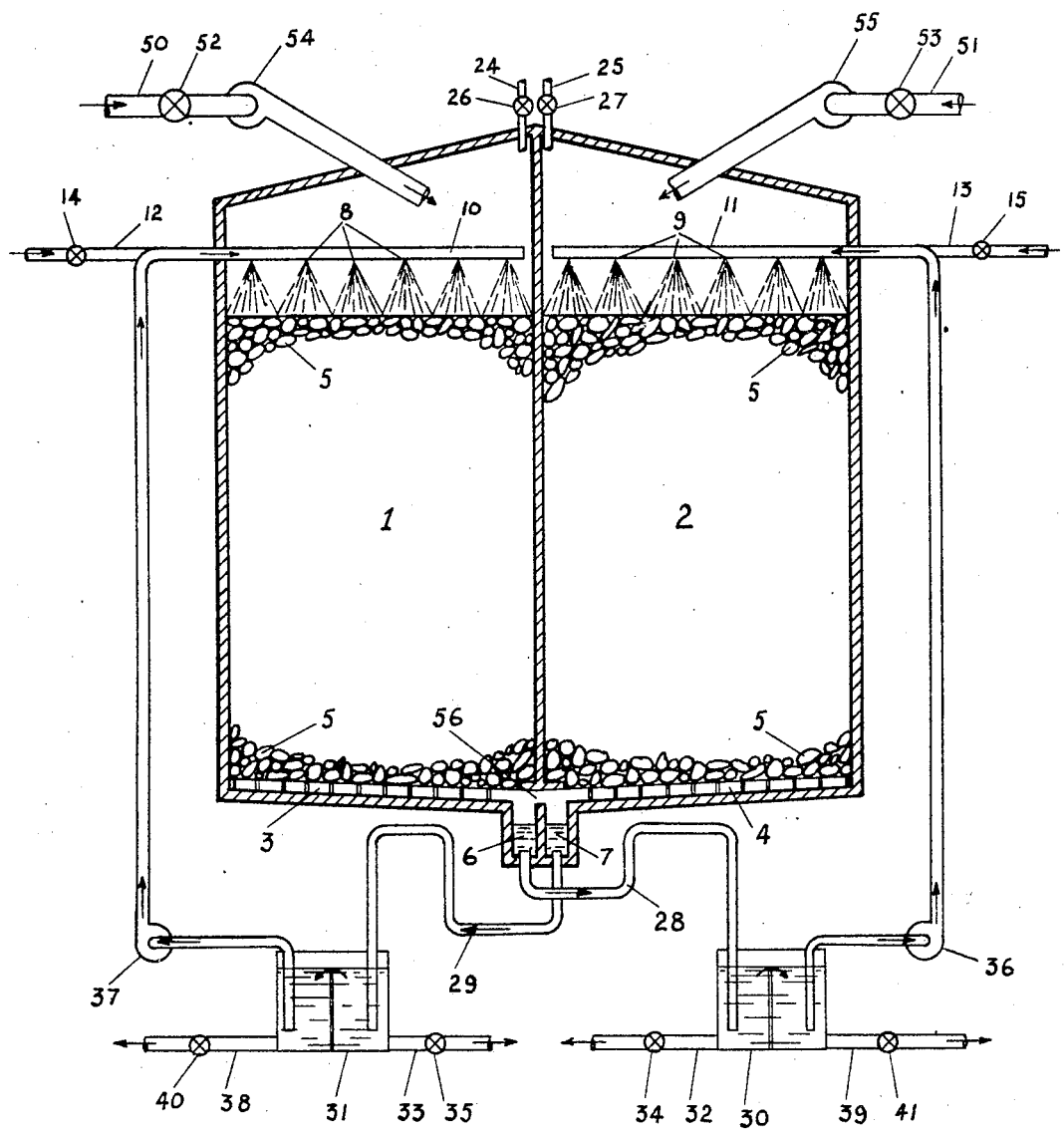
Fig. 2 is a diagrammatic vertical section of a modified construction of the apparatus.

In a modified construction as diagrammatically illustrated in Fig. 2, air may be forced into the top of chamber 1 from pipe 50 which is provided with a control valve 52, and a suitable blower 54. The air is forced downwardly through the filter media of chamber 1 and through opening or air passage 56 into chamber 2 where the air passes upwardly through the filter media in counterflow to the direction of the liquid. The air leaves chamber 2 through pipe 25 which is fitted with control valve 27, and the pipe 25 may be connected to further filters of the series or to suitable disposing means.

The direction of the air flow can be reversed by closing valve 27, opening valve 26 and forcing the air through filter chamber 2 first, by closing valve 52 and forcing the air through blower 55 which is connected to valve 53 and pipe 51 which in turn is connected to the air supply. The flow of liquid in the modified arrangement is similar to that in the previously described apparatus as shown in Fig. 1.

It is to be understood that when the untreated sewage is admitted to chamber 1 through valve 14, valve 15 is closed but for reversing the direction of circulation valve 14 is closed and valve 15 opened, whereby the effluent liquid from chamber 2 is collected in sediment tank 31 from where said liquid is elevated to pipe 10 by means of pump 37 for passage through chamber 1 which now becomes the secondary filtration chamber, and filtration chamber 2 the primary. The effluent from chamber 1 in sediment tank 30 may be recirculated through the chambers 2 or 1 or both, or may be circulated through the next chambers of the series of filters, or may be drained off through pipe 39 controlled by valve 41.

The above arrangements for circulating effluent enables alteration of the "substrate loading" to any filter to be effected and together with reversing valves 14 and 15, provide means for carrying out a sequence change.

Such sequence change should be carefully controlled. It should take not less than three weeks to complete such transition which as applied to any filter of a series is carried out in carefully controlled steps by gradual mixing of the normal influent to said filter of said series with liquid of a different standard of purity circulated from another stage within the process until said circulated liquid constitutes 50% (fifty per cent) by volume of the new influent to said filter. The order of said filter in said series is now altered by means of the reversing valves after which stepwise mixing is continued as before until the influent to said filter consists entirely of said circulated liquid.

The quantity of air supplied in the cycle of operation is most important and should be controlled and measured to give the requisite amount required to give the greatest efficiency for any particular sewage or impure water under treatment.

This quantity of air will vary depending upon the strength and nature of the sewage to be treated and for a mediumly strong sewage may vary from 1½ to 3 cubic feet per minute of air per cubic yard of filter media.

Likewise the temperature is most important and it will be found that for highest efficiency the internal temperature of the filter media mass should be maintained at about 80° to 90° Fahrenheit for domestic sewage and on no account should very cold air be drawn or forced through the media, if such is likely to cause chilling thereof.

The media mass temperature may be maintained by heating the air entering the chambers or by heating the sewage to be treated or by the installation of any suitable heaters, such as coiled hot fluid circulating pipes, etc., either in the body of the media or above it, or by a combination of any of these methods. The entering of air may be enriched with ozone or any other suitable gas or vapour.

The most efficient method would depend upon the plant and facilities available.

In order to keep this apparatus flyproof it is necessary to screen effectively all air inlets and exhausts and to keep the whole chamber structure sealed.

The chambers 6 and 7 must also be trapped at or near the outlets to pipes 28 and 29 by keeping the entrances to these pipes submerged in order to prevent the escape of air and/or insect.

What I claim is:

1. A process for the progressive purification of a biologically impure liquid which comprises percolating it downwardly in succession through each of a series of two or more biological filters, aerating the filter medium in each of the filters by forcing there-through a regulated volume of an oxygen-containing gas under controlled pressure, separating from the partially purified effluent from each filter said gas and contained solids before it is passed as the influent to the next succeeding filter; maintaining the purity of the final effluent by mixing of the normal influent to a filter of the series with effluent circulated from any filter of the series; and periodically changing the order of the sequence of liquid flow through the series of filters by a controlled transition involving proportionate stepwise mixing of the normal influent liquid to any filter of the series with liquid of a different standard of purity from any stage within the process until the said sequence change is complete, thereby permitting recuperation of biological activity of any filter and preventing clogging of the filter medium from taking place, without lessening the rate of dosage of the biologically impure liquid being treated by the process.

2. Apparatus for the progressive purification of a biologically impure liquid comprising a series of two or more biological filters, means for percolating the liquid to be purified downwardly in succession through each of the filters, means for forcing through the filter medium in each of the filters a regulated volume of an oxygen-containing gas under controlled pressure, means for separating from the partially purified effluent from each filter said gas and contained solids, means for then passing the effluent as the influent to the next succeeding filter, and means for changing the order of sequence of liquid flow through the series of filters to permit recuperation of biological activity of any filter and to prevent clogging of the filter medium from taking place without lessening of the rate of dosage of the biologically impure liquid being treated by the apparatus.

3. Apparatus in accordance with claim 2 having an air trap sump at the bottom of each filter in which the partially purified liquid is collected, a sedimentation tank for each sump, means for passing the liquid from each sump to its sedimentation tank, and means for elevating and passing the supernatant liquid from each sedimentation tank as the influent to the top of the next succeeding filter.

4. Apparatus in accordance with claim 2 having means for admitting to each filter untreated impure liquid, and means for circulating effluent from any filter of the series and for admitting it for treatment to any filter of the series.

CECIL JOHN DEKEMA.